UNITED STATES PATENT OFFICE.

MORITZ ULRICH, OF ELBERFELD, GERMANY, ASSIGNOR TO THE FARBENFABRIKEN OF ELBERFELD COMPANY, OF NEW YORK.

ORANGE DYE AND PROCESS OF MAKING SAME.

SPECIFICATION forming part of Letters Patent No. 611,663, dated October 4, 1898.

Application filed November 4, 1897. Serial No. 657,441. (Specimens.)

*To all whom it may concern:*

Be it known that I, MORITZ ULRICH, doctor of philosophy, residing at Elberfeld, Germany, (assignor to the FARBENFABRIKEN OF ELBERFELD COMPANY, of New York,) have invented a new and useful Improvement in the Manufacture of Orange Dyes; and I do hereby declare the following to be a clear and exact description of my invention.

My invention relates to the production of a new class of orange dyestuffs dyeing unmordanted cotton by combining one molecule of a diazotized paraamidoazo sulfo-acid of the benzene series—such as amidoazo-benzene sulfo-acid, amidoazo-toluene sulfo-acid, or the like—with one molecule of a nitrometadiamin of the benzene series, such as nitrometaphenylenediamin (see *Berichte der Deutschen Chemischen Gesellschaft*, Vol. VII, p. 1259) or nitrometatoluylenediamin, (see *Berichte der Deutschen Chemischen Gesellschaft*, Vol. VIII, p. 1211, Vol. III, p. 379.) The dyestuffs thus produced represent orange-red powders which dissolve in warm water with an orange-red color and possess a great affinity to the cotton fiber, producing very intense and bright orange shades, which are distinguished by reason of their resistance to acids, alkalies, and light.

In carrying out my new process practically I can proceed as follows: 27.7 kilos, by weight, of paraamidoazo-benzene sulfo-acid are diazotized in the known manner by means of seven kilos, by weight, of sodium nitrite and twenty-one kilos, by weight, of muriatic acid, (containing 36.5 per cent. of pure HCl.) The diazoazo-benzene sulfo-acid thus obtained is introduced into a dilute solution of nitrometaphenylenediamin, which may be prepared by dissolving sixteen kilos, by weight, of the said nitro compound in about two thousand liters of water, with the addition of twenty-one kilos, by weight, of muriatic acid, (containing 36.5 per cent. of pure HCl.) The temperature is slowly raised to from 50° to 60° centigrade, the dyestuff being thus separated in orange-red flakes. After about twelve hours the liquid mixture is filtered and the dyestuff, being in the form of the free acid, is dissolved by means of hot dilute sodium-carbonate solution. By subsequently adding common salt to this solution the finished dyestuff in the form of the sodium salt is precipitated.

It is characterized by containing in its molecular arrangement the group

When filtered off, pressed, and dried, it represents an orange-red powder which dissolves in hot water with an orange color. By concentrated sulfuric acid it is dissolved with a brownish-yellow color, which turns into violet on adding a suitable quantity of ice.

The new dyestuff dyes unmordanted cotton bright and intense orange shades which are fast to the action of alkalies, of acids, and of light.

Having now described my invention and in what manner the same is to be performed, what I claim as new, and desire to secure by Letters Patent, is—

1. The process for producing new disazo dyestuffs by combining one molecule of a diazotized paraamidoazo sulfo-acid of the benzene series, such as amidoazo-benzene sulfo-acid, amidoazo-toluene sulfo-acid with one molecule of a nitrometadiamin of the benzene series such as nitrometaphenylenediamin, in the manner hereinbefore described.

2. The process for producing a new orange dye by coupling one molecule of diazotized amidoazo-benzene sulfo-acid with one molecule of nitrometaphenylenediamin in the manner hereinbefore described.

3. The new disazo dyestuffs derived from a diazotized paraamidoazo sulfo-acid of the benzene series, such as amidoazo-benzene sulfo-acid, by combination with a nitrometadiamin of the benzene series, such as nitrometaphenylenediamin, and characterized by containing in its molecular arrangement the grouping:

"R" representing in this formula a hydrogen atom which may be substituted by a methyl group representing orange-red powders soluble in warm water with an orange color and yielding on unmordanted cotton orange shades which are fast to acids, alkalies and light substantially as described.

4. The new dyestuff derived from diazotized amidoazo-benzene sulfo-acid by combination with nitrometaphenylenediamin characterized by containing in its molecular arrangement the group:

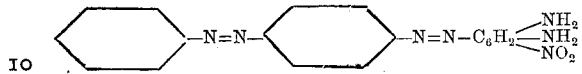

being an orange-red powder soluble in warm water with an orange color, in concentrated sulfuric acid with a brownish-yellow color, yielding on unmordanted cotton intense orange shades which are fast to acids, to alkalies and to light substantially as described.

In testimony whereof I have signed my name in the presence of two subscribing witnesses.

MORITZ ULRICH.

Witnesses:
R. E. JAHN,
OTTO KÖNIG.